(12) United States Patent
Crowley et al.

(10) Patent No.: US 10,260,425 B2
(45) Date of Patent: Apr. 16, 2019

(54) LEAK DETECTION, ISOLATION AND ACCOMMODATION ASSEMBLY FOR GAS TURBINE ENGINES

(71) Applicant: United Technologies Corporation, Farmington, CT (US)

(72) Inventors: Timothy J. Crowley, Tolland, CT (US); Tyler J. Selstad, West Hartford, CT (US); Sorin Bengea, Auburn, MA (US); Robert H. Luppold, West Newton, PA (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 186 days.

(21) Appl. No.: 15/147,173

(22) Filed: May 5, 2016

(65) Prior Publication Data

US 2017/0321608 A1    Nov. 9, 2017

(51) Int. Cl.
*F02C 7/22* (2006.01)
*F02C 7/232* (2006.01)
(Continued)

(52) U.S. Cl.
CPC ............... *F02C 7/222* (2013.01); *F02C 7/22* (2013.01); *F02C 7/232* (2013.01); *F02C 7/236* (2013.01);
(Continued)

(58) Field of Classification Search
CPC .. F02C 7/22; F02C 7/222; F02C 7/232; F02C 9/00; F02C 9/26; F02C 9/263; F02C 9/28;
(Continued)

(56) References Cited

U.S. PATENT DOCUMENTS 6,761,629 B1    7/2004  Parker et al.
7,826,954 B2 *  11/2010 Muramatsu ........... F01D 21/003
                                                                  477/30
(Continued)

FOREIGN PATENT DOCUMENTS

WO    2014014536    1/2014

OTHER PUBLICATIONS

Cork, L., Walker, R.A., & Dunn, S. (2005). Fault detection, identification and accommodation techniques for unmanned airborne vehicles. In Australian International Aerospace Congress, Mar. 15, 2005, Melbourne. pp. 1-18.
(Continued)

*Primary Examiner* — Phutthiwat Wongwian
*Assistant Examiner* — Loren Edwards
(74) *Attorney, Agent, or Firm* — Carlson, Gaskey & Olds, P.C.

(57) ABSTRACT

A fuel system for a gas turbine engine includes, among other things, a plurality of components defining a plurality of localized nodes at distinct locations relative to a fuel flow path, each of the plurality of localized nodes characterized by a distinct set of failure parameters. One or more fuel sensors are configured to measure at least one fuel condition relating to flow through the fuel flow path. A fuel observation assembly is coupled to one or more engine sensors configured to measure at least one engine condition. The fuel observation assembly comprises an estimation module operable to calculate an expected condition of each of the plurality of localized nodes based upon the set of failure parameters, an observation module operable to calculate an observed condition of each of the plurality of localized nodes, the observed condition based on present values of the at least one fuel condition and the at least one engine condition, and a comparison module operable to determine
(Continued)

an abnormality corresponding to a first one of the plurality of localized nodes based upon a comparison of the expected condition and the observed condition for each of the plurality of localized nodes.

22 Claims, 4 Drawing Sheets

(51) Int. Cl.
*F02C 7/236* (2006.01)
*F02C 9/00* (2006.01)
*F02C 9/28* (2006.01)

(52) U.S. Cl.
CPC ............... *F02C 9/00* (2013.01); *F02C 9/28* (2013.01); *F05D 2220/32* (2013.01); *F05D 2260/80* (2013.01)

(58) Field of Classification Search
CPC ............ F05D 2220/32; F05D 2260/80; F05D 2260/83; F05D 2260/821
USPC ...................................... 60/776, 39.094, 223
See application file for complete search history.

(56) References Cited

U.S. PATENT DOCUMENTS

| | | | |
|---|---|---|---|
| 8,707,769 | B2 | 4/2014 | Brown |
| 2008/0125930 | A1 | 5/2008 | Johnson |
| 2008/0319629 | A1* | 12/2008 | Iraudo .................... B64D 43/00 |
| | | | 701/100 |
| 2010/0288883 | A1 | 11/2010 | Rivot |
| 2012/0167594 | A1 | 7/2012 | Poisson et al. |
| 2013/0269364 | A1* | 10/2013 | Romig .................... F02C 7/232 |
| | | | 60/779 |
| 2015/0052980 | A1 | 2/2015 | Sheldon et al. |
| 2015/0308915 | A1 | 10/2015 | Konatham |

OTHER PUBLICATIONS

Kobayashi, T & Simon, D.L. (2003). Application of a bank of kalman filters for aircraft engine fault diagnostics. NASA/TM-2003-212526. Glenn Research Center. Prepare for the Turbo Expo 2003 cosponsored by the ASME and the International Gas Turbine Institute. Atlanta, GA. Jun. 16-19, 2003. pp. 1-10.

European Search Report for European Patent Application No. 17169774 dated Jan. 10, 2018.

* cited by examiner

LEAK DETECTION, ISOLATION AND ACCOMMODATION ASSEMBLY FOR GAS TURBINE ENGINES

BACKGROUND

This disclosure relates to detecting, isolation and/or accommodating a leakage condition in a fuel system for a gas turbine engine.

Gas turbine engines can include a fan for propulsion air. The fan also delivers air into a core engine where it is compressed. The compressed air is then delivered into a combustion section, where it is mixed with fuel and ignited. The combustion gas expands downstream over and drives turbine blades.

The combustion section is typically coupled to a fuel supply by one or more conduits. Components of the fuel supply such as one of the conduits may experience a loss of fuel during engine operation, such as during extended time operations (ETOPS) of the aircraft due to fuel leakage.

SUMMARY

A fuel system for a gas turbine engine according to an exemplary aspect of the present disclosure includes a plurality of components defining a plurality of localized nodes at distinct locations relative to a fuel flow path, each of the plurality of localized nodes characterized by a distinct set of failure parameters, one or more fuel sensors configured to measure at least one fuel condition relating to flow through the fuel flow path, and a fuel observation assembly coupled to one or more engine sensors configured to measure at least one engine condition. The fuel observation assembly includes an estimation module operable to calculate an expected condition of each of the plurality of localized nodes based upon the set of failure parameters, an observation module operable to calculate an observed condition of each of the plurality of localized nodes, the observed condition based on present values of the at least one fuel condition and the at least one engine condition, and a comparison module operable to determine an abnormality corresponding to a first one of the plurality of localized nodes based upon a comparison of the expected condition and the observed condition for each of the plurality of localized nodes.

In a further non-limiting embodiment of any of the foregoing embodiments, the estimation module is operable to calculate the expected condition of each of the plurality of localized nodes based upon estimated values and observed values of the at least one fuel condition and estimated values and observed values of the at least one engine condition.

In a further non-limiting embodiment of any of the foregoing embodiments, the plurality of components includes a metering valve operable to regulate flow through the fuel flow path in response to a metering signal, and the at least one fuel condition includes the metering signal.

In a further non-limiting embodiment of any of the foregoing embodiments, the at least one fuel condition relates to one or more fuel boundary conditions affecting flow through the fuel flow path and one or more fuel command signals to the plurality of components, and the at least one engine condition relates to one or more engine boundary conditions.

In a further non-limiting embodiment of any of the foregoing embodiments, the observed condition relates to a fuel flow rate through a corresponding one of the plurality of localized nodes.

In a further non-limiting embodiment of any of the foregoing embodiments, the estimation module is operable to calculate the expected condition of each of the plurality of localized nodes based upon a previous calculation of the corresponding expected condition.

In a further non-limiting embodiment of any of the foregoing embodiments, the estimation module is operable to adjust the expected condition based upon a set of failure hypotheses and associated uncertainty parameters and sensitivity parameters, the set of sensitivity parameters based on a relationship between the set of failure parameters, the at least one fuel condition, and the at least one engine condition.

In a further non-limiting embodiment of any of the foregoing embodiments, the abnormality is a first abnormality, the comparison module is operable to cause the expected condition to be adjusted based on the first abnormality, and is operable to determine a second, different abnormality corresponding to another one of the plurality of localized nodes in response to adjustment of the expected condition.

A propulsion system according to another exemplary aspect of the present disclosure includes a gas turbine engine including a combustor section in flow communication with a turbine section, a fuel system defining a plurality of localized nodes including a metering valve, the metering valve operable to meter flow between the combustor section and a fuel source in response to a metering signal, each of the plurality of localized nodes characterized by a distinct set of failure parameters, and a fuel observation assembly coupled to the engine and the fuel system. The fuel observation assembly includes an estimation module operable to calculate an expected condition of each of the plurality of localized nodes based upon at least the metering signal, at least one fuel condition relating to the fuel assembly, and at least one engine condition relating to the engine, wherein the expected condition corresponds to at least one parameter of the set of failure parameters, an estimation module operable to calculate an observed condition of each of the plurality of localized nodes based on present values of the at least one fuel condition and the at least one engine condition, and a comparison module operable to determine an abnormality corresponding to a first one of the plurality of localized nodes based upon a comparison of the expected condition and the observed condition for each of the plurality of localized nodes.

In a further non-limiting embodiment of any of the foregoing embodiments, the estimation module is operable to calculate the expected condition based on a first control signal to the engine and a second control signal to the fuel system, each of the first and second control signals relating to fuel flow through the fuel assembly.

In a further non-limiting embodiment of any of the foregoing embodiments, the comparison module is operable to associate the abnormality with a single parameter of the set of failure parameters.

In a further non-limiting embodiment of any of the foregoing embodiments, the set of failure parameters includes at least a leakage condition and a sensor failure condition relating to a corresponding one of the plurality of localized nodes.

In a further non-limiting embodiment of any of the foregoing embodiments, the at least one fuel condition relates to one or more boundary conditions of the fuel system and one or fuel command signals to the fuel system, and the at least one engine condition relates to one or more boundary conditions of the engine.

In a further non-limiting embodiment of any of the foregoing embodiments, the plurality of localized nodes are defined by at least one of a fuel pump coupled to the fuel source, an actuator, the metering valve, a distribution valve coupled to fuel injectors of the combustor section, and the combustor section.

In a further non-limiting embodiment of any of the foregoing embodiments, the comparison module is operable to cause an alert to be communicated to an aircraft cockpit in response to the abnormality meeting at least one predetermined criterion.

In a further non-limiting embodiment of any of the foregoing embodiments, the comparison module is operable to calculate an estimated fuel flow through the fuel assembly based on the abnormality, and is operable to cause a flight plan of an aircraft to adjust based on the estimated fuel flow.

In a further non-limiting embodiment of any of the foregoing embodiments, the abnormality relates to a sensor failure, the comparison module is operable to estimate of a present value of the one or more fuel sensors and the one or more engine sensors associated with the abnormality, and is operable to communicate the present value to an engine control system.

A method of detecting a fuel abnormality according to another exemplary aspect of the present disclosure includes associating each a plurality of localized nodes to a distinct set of failure parameters, the plurality of localized nodes defining a fuel flow path between a fuel source and a combustor of an engine, determining an expected condition of each of the plurality of localized nodes based on the set of failure parameters, at least one fuel condition relating to the plurality of localized nodes, and at least one engine condition relating to the engine, sensing a present state of the at least one engine condition and a present state of the at least one fuel condition, determining an observed condition of each of the plurality of localized nodes, the observed condition based on the present state of the at least one fuel condition and the present state of the at least one engine condition, determining a likelihood output for each parameter of the set of failure parameters based on comparing the expected condition and the observed condition of each of the plurality of localized nodes, and determining an abnormality corresponding to a single one of the set of failure parameters in response to the likelihood output meeting a predetermined criterion.

In a further non-limiting embodiment of any of the foregoing embodiments, the set of failure parameters includes a leakage condition and a sensor failure condition.

In a further non-limiting embodiment of any of the foregoing embodiments, the at least one fuel condition includes one or more boundary conditions of the fuel flow path, and the at least one engine condition includes one or more engine boundary conditions of the engine.

The various features and advantages of this invention will become apparent to those skilled in the art from the following detailed description of an embodiment. The drawings that accompany the detailed description can be briefly described as follows.

DETAILED DESCRIPTION

Figure 1:
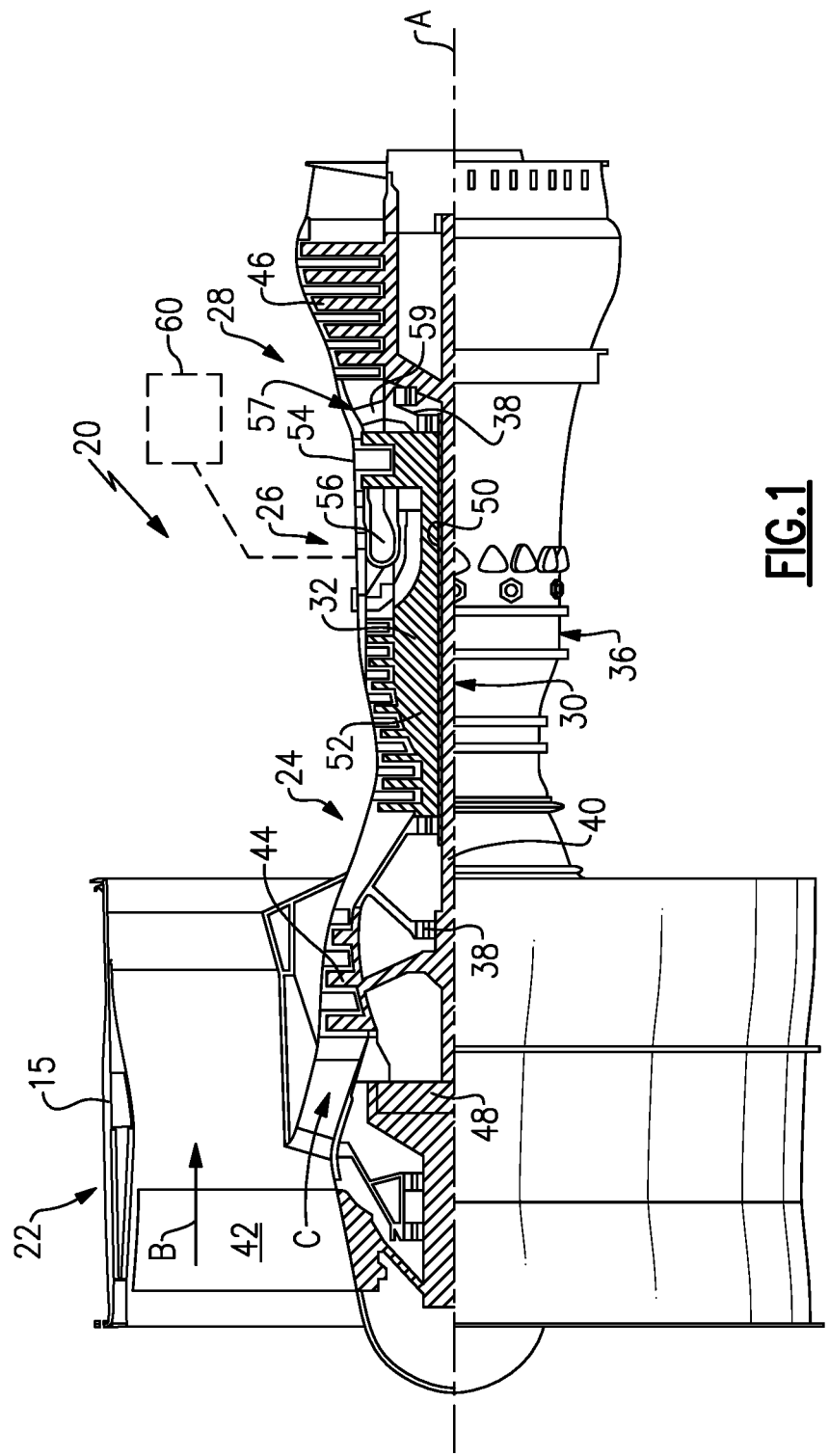
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

Figure 2:
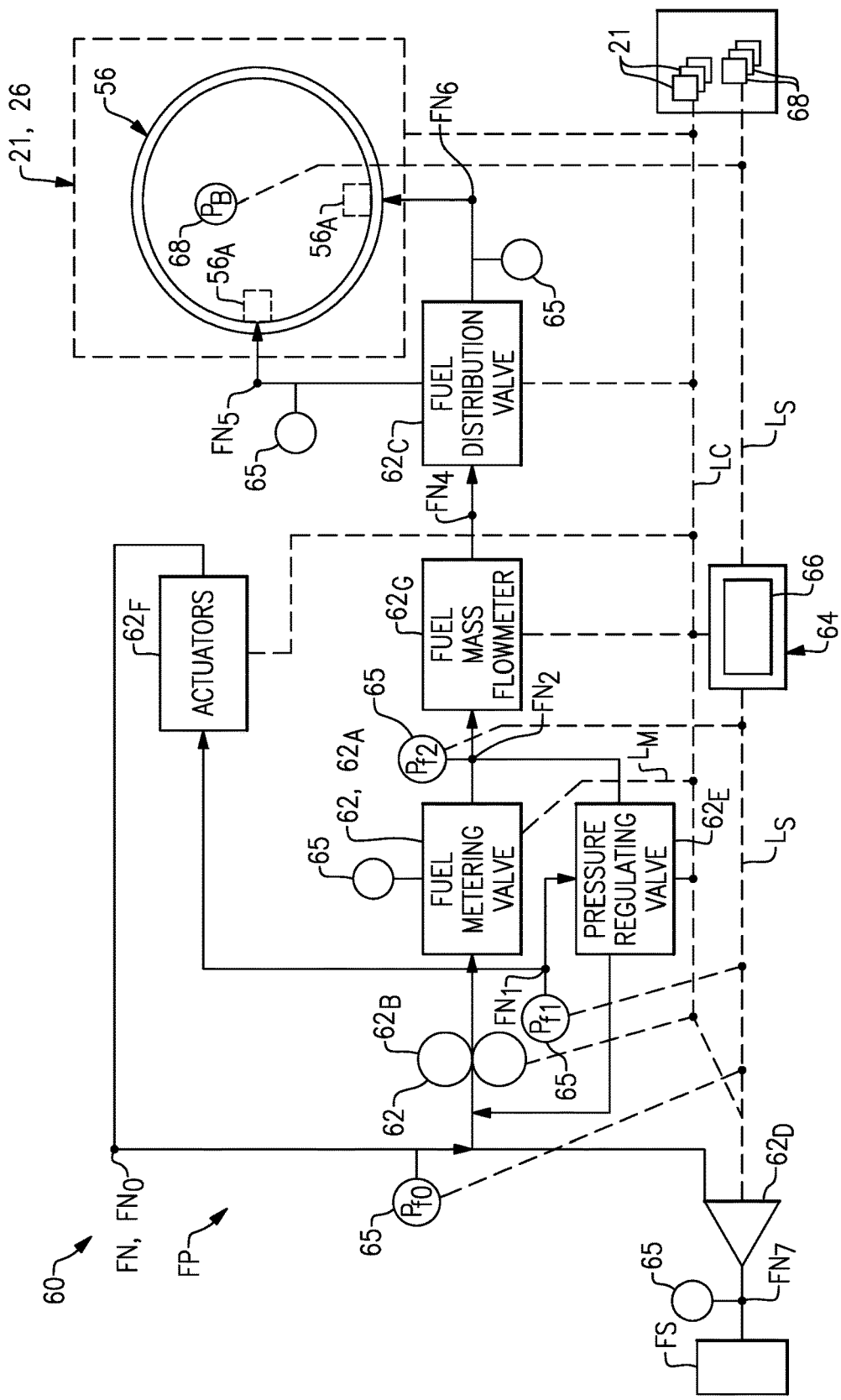
FIG. 2 illustrates a fuel system, according to an embodiment.

FIG. 2 illustrates a fuel system 60 for the gas turbine engine 20, according to an embodiment. The fuel system 60 includes a plurality of components 62 that define a fuel flow path FP. Example components 62 can include a fuel metering valve $62_A$ coupled to a fuel source $F_S$. The metering valve $62_A$ is operable to meter flow between the combustor section 26 and the fuel source $F_S$ in response to a metering signal on command line $L_M$. Other example components 62 can include a main fuel pump $62_B$ coupled to the fuel source $F_S$ and driven by the engine 20, a distribution valve $62_C$ coupled to one or more fuel injectors $56_A$ of the combustor 56, and a boost pump $62_D$ coupled between the fuel source $F_S$ and the main pump $62_B$. Other components 62 can include a pressure regulating valve $62_E$ coupled between the metering valve $62_A$ and distribution valve $62_C$ to regulate pressure between portions of the fuel flow path FP, and one or more actuators $62_F$ operable to actuate one or more components in response to flow of fluid to the actuators $62_F$. Example actuators can include fuel-draulics actuators such as one or more vane actuators. The vane actuator may be utilized to vary an angle of a variable vane in the compressor section 24, for example.

The fuel system 60 is coupled to a controller 64 operable to communicate various information with the components 62, such as commands or other signals to the component 62 via one or more command lines $L_C$. Controller 64 is operable to send and/or receive command signals and other information between one or more engine subsystems 21 of the engine 20 or aircraft via the command lines $L_C$. Example subsystems 21 can include fan section 22, compressor section 24, combustor section 26 and turbine section 28. Command lines $L_C$ and signal lines $L_S$ can be electrical/digital, mechanical, pneumatic, and hydraulic lines or connections, for example.

Controller 64 is operable to receive measurements of present values of the engine 20 and fuel system 20, for example, from one or more fuel sensors 65 and engine sensors 68 via sensor lines $L_S$. Fuel sensors 65 are located at various positions of the fuel system 60 and are configured to measure of at least one fuel condition 70 relating to flow through the fuel flow path FP. The engine sensors 68 are configured to measure at least one engine condition 72 relating to operating characteristics of the engine 20, which may also affect flow through the fuel flow path FP. The fuel and engine sensors 65, 68 can be configured to measure or otherwise sense one or more fuel boundary conditions, engine boundary conditions, or other operational conditions of the fuel system 60 and/or engine 20. For purposes of this disclosure, "fuel boundary condition" means a condition that affects flow and/or pressure through the fuel flow path FP, such as actuation of the metering valve $62_A$, fuel flow ($W_f$) from fuel source $F_S$ and related commands or requests, and burner pressure ($P_B$). The term "engine boundary condition" means a condition that affects the operating characteristics of the engine 20, such as ambient temperature/pressure and power demand relating to throttle position.

Example fuel sensors 65 can include pressure sensor $P_{f0}$ operable to measure pressure in the fuel flow path FP between actuator $62_F$ and boost pump $62_D$, and fuel sensor $P_{f1}$ operable to measure pressure in the fuel flow path FP between actuator $62_F$ and/or main pump $62_B$ and pressure regulating valve $62_E$. Other example fuel sensors 65 can include pressure sensor $P_{f2}$ operable to measure pressure between fuel metering valve $62_A$ and fuel mass flow meter $62_G$. Although sensors 65 are illustrated as pressure sensors, it should be understood that other sensors can be utilized, such as temperature sensors and flowmeters at various locations in the fuel flow path FP and metering valve spool positions and commands.

Engine sensors 68 are positioned at various locations of the engine 20 or propulsion system. Example engine sensors 68 can include a sensor in the combustor section 26 operable to measure burner pressure ($P_B$) of the combustor 56. Other example engine sensors 68 can include sensors to measure a rotational speed ($N_1$, $N_2$) of the low speed spool 30 and/or high speed spool 32, a rotational speed of the fan 42, and pressure and temperature sensors at various locations of the engine 20, such as the fan section 22, compressor section 24, and turbine section 28, and geared architecture 48.

Utilizing the techniques discussed herein, information from the engine 20 and fuel system 60 can be fused together to determine an abnormality of the fuel system 60. For example, a leakage condition downstream of the flow meter $62_G$ may not be detected based on evaluation of sensor measurements of the fuel system 60, whereas the leakage condition may be detected by utilizing sensor measurements of the fuel system 60 and the engine 20. It should also be appreciated that the teachings herein may benefit system pairings other than the fuel system and engine 20. In the illustrated embodiment, the fuel observation assembly 60 is operable to compare a pattern, rather than only fuel flow, at a given localized node $F_N$ to detect and isolate an abnormality.

The plurality of components 62 define a plurality of localized nodes $F_N$ at various distinct locations relative to fuel flow path FP. For the purposes of this disclosure, the term "localized node" means a distinct location or region of the fuel flow path FP, such as one of the components 62, a location between components 62 such as a conduit, or between the fuel system 60 and another portion of the engine 20 or aircraft, such as fuel injectors $56_A$ of the combustor section 56. Example locations of the nodes $F_N$ can include locations $F_{N0}$ through $F_{N7}$. It should also be understood that other nodes can be defined relative to the fuel system 60, such as one or more of the command lines $L_C$ and signal lines $L_S$.

Figure 3:
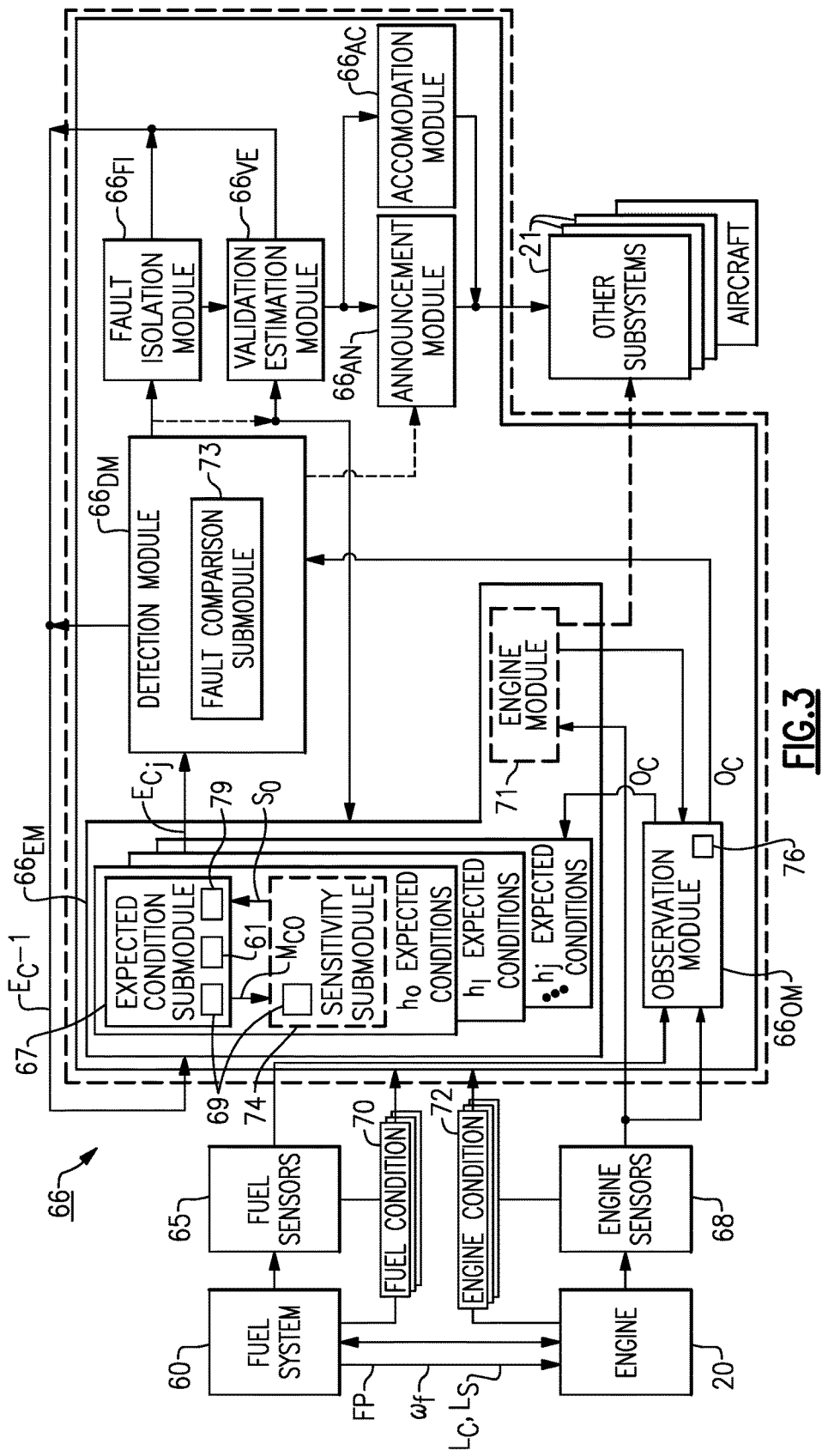
FIG. 3 illustrates a fuel observation assembly, according to an embodiment.

Referring to FIG. 3 with continued reference to FIG. 2, an embodiment of a fuel observation assembly 66 for detection of abnormalities of the fuel system 60 is shown. Although the fuel observation assembly 66 is primarily described relative to a single engine 20, in alternative embodiments the fuel observation assembly 66 is utilized for two or more engines. In the illustrated embodiment, controller 64 is configured to execute the fuel observation assembly 66. The fuel observation assembly 66 includes an estimation module $66_{EM}$, an observation module $66_{OM}$, and a detection module $66_{DM}$. In some embodiments, the functionality of the estimation module $66_{EM}$ and/or observation module $66_{OM}$ are combined with the detection module $66_{DM}$.

Each of the plurality of localized nodes $F_N$ can be characterized by uncertain parameters including a predetermined, distinct set of failure conditions or parameters 69. For purposes of this disclosure, the term "failure parameter" means a distinct, predefined condition corresponding to one of the localized nodes $F_N$ of the fuel system 60 which may directly or indirectly affect normal operation of the fuel system 60, and which are based on the particular structural and functional characteristics of the localized node $F_N$. Each failure parameter can impart a different signature of observed conditions relative to a location of the fuel flow path FP or a particular sensor 65, 68, for example. Some example characteristics can include geometry of the localized node $F_N$, such as a volume of a conduit, and metering characteristics of a valve. The failure parameters 69 can include leakage area for a leakage condition at a particular one of the nodes $F_N$, a sensor failure condition of one of the sensors 65, 68, or nozzle lacquering delta area of the fuel injectors $56_A$. Another example failure parameter 69 can include an unknown/novel or previously uncategorized failure condition. The novel condition can be defined relative to the two or more localized nodes FN of the fuel flow path FP, for example, and may provide an indication that the other failure conditions 69 are unlikely causes of an abnormality. At least some of the failure parameters 69 of one of the localized nodes $F_N$ can be interrelated with at least some failure parameters of another one of the localized nodes $F_N$.

The observation module $66_{OM}$ is configured to receive and aggregate one or more predefined fuel conditions 70 and one or more predefined engine conditions 72, with present values measurable directly or indirectly by fuel and engine sensors 65, 68 or estimated present values from engine module 71 or virtual sensors based on other available sensor data. The fuel conditions 70 can include fuel boundary condition(s) affecting flow through the fuel flow path FP, such as burner pressure $(P_B)$ of the combustor 56, and a speed of the fuel pump $62_B$. Other example fuel conditions 70 can include various control signals on control lines $L_C$ to the components 62 of the fuel system 60, such as commands to flow distribution valve $62_C$ and pressure regulation valve $62_E$. Example engine conditions 72 can include one or more boundary conditions affecting operation of the engine 20, or other operating conditions of the engine 20. Other engine conditions 72 can include one or more commands to various components of the engine 20, such as commands to an environmental control system (ECS).

The observation module $66_{OM}$ is operable to determine an observed condition $O_C$ of each of the localized nodes $F_N$ based on measurements from the fuel and engine sensors 65, 68, such as present values of one or more of the fuel conditions 70 and/or engine conditions 72. The observed condition $O_C$ can include temperatures, pressures (e.g., supply, return, or regulated), and/or another desired condition of the localized node $F_N$, and can include gas path pressures and temperatures, actuator values, and rotor speeds of the engine 20. Other example observed conditions $O_C$ can include positions of actuator $62_F$ and valve $62_A$. In some embodiments, the observed condition $O_C$ relates to a fuel flow rate through a corresponding one of the localized nodes $F_N$. The fuel flow rate may be determined by evaluating a pressure difference and/or temperature at a particular one of the localized nodes $F_N$ utilizing conditions sensed at one of the fuel sensors 65. In other embodiments, the fuel flow rate may be determined by utilizing a flow meter position in the fuel flow path FP, such as flowmeter $62_G$. The engine module 71 can forward or otherwise communicate estimates of parameters, such as combustor fuel flow estimate, to the observation module $66_{OM}$. In some embodiments, the engine estimator is integrated into the expected condition module $66_{EM}$.

The observation module $66_{OM}$ is operable to aggregate uncertainty parameters 76 that quantify uncertainty of the various fuel and engine sensor values, and engine estimated conditions. For example, the uncertainty parameters 76 for sensed fuel and engine parameters may quantify uncertainty in these sensed parameters and are used by the expected condition module $66_{EM}$ to weight the sensor information according to their respective uncertainties. The observation module $66_{OM}$ is operable to forward aggregated observed conditions $O_C$ to other portions of the fuel observation assembly 66. Along with the observed conditions $O_C$, the observation module $66_{OM}$ also forwards the aggregated observation uncertainty parameters 76 associated with the observed conditions $O_C$. In an embodiment, the observation uncertainty parameters 76 are in the form of an observation covariance matrix. The uncertainty parameters 76 quantify expected uncertainty in the observed conditions $O_C$. This uncertainty information is forwarded to the detection module $66_{DM}$ for computing likelihood function values for each of the failure hypotheses, as discussed in more detail below.

In the illustrated embodiment, model-based failure detection and isolation is based upon a mathematical comparison of observed conditions $O_C$ with expected conditions $E_C$. The expected conditions $E_C$ can be generated by models that can accurately compute the relationships between measured fuel and engine conditions 70, 72 with respect to failure parameters 69. The relationships between fuel conditions 70 and/or engine conditions 72, on one hand, and the fuel system 60 and its uncertain parameters, including failure parameters 69, on the other, can be modeled using various models or techniques such as dynamical physics-based models, sensitivity matrices, maps, look-up tables, etc. Said differently, the fuel observation assembly 66 is operable to model, or to utilize model(s), the operation and various associated characteristics of the components 62 relative to the fuel conditions 70 and/or engine conditions 72 expected to be observed during operation. Example uncertain fuel system parameters can includes characteristics such as geometry and connectivity of the components 62. Other parameters can include various performance characteristics of the engine 20. Another fuel condition 70 can include a position and flow characteristics of the metering valve $62_A$ relative to values of metering signal $L_M$.

The estimation module $66_{EM}$ is configured to receive one or more observed conditions $O_{Cj}$ and associated uncertainties. The observed conditions $O_{Cj}$ can include sensed fuel and engine conditions 70, 72, as well as control command signals such as metering valve position commands. The observed conditions $O_{Cj}$ contain boundary conditions or inputs utilized by the system model(s) contained within the estimation module $66_{EM}$. In the illustrated embodiment, the estimation module $66_{EM}$ includes one or more hypothesis-specific expected condition submodules 67 operable to calculate expected conditions $E_{Cj}$ of each of the localized nodes $F_N$ based on the set of hypothesis-specific failure parameters 69, associated with each of the failure hypotheses $h_j$. The expected conditions $E_{C0}$, $E_{C1}$, . . . $E_{Cj}$ represent model-based, estimated values of one or more fuel conditions 70 and/or engine conditions 72. The model-based estimates $E_{Cj}$, are responsive to the observed conditions $O_{Cj}$, and to hypothesis specific failure parameters 69, as well as uncertainty parameters 61 associated with the failure parameters 69 and/or with internal model parameters (e.g. dynamic states). The estimation module $66_{EM}$ is configured to provide the expected conditions $E_{Cj}$ to the detection module $66_{DM}$. Along with the expected conditions $E_{Cj}$, the estimation module $66_{EM}$ also forwards hypothesis-specific expected condition uncertainty parameters 79 associated with the expected conditions $E_{Cj}$. The expected condition uncertainty parameters 79 can be in the form of an expected condition covariance matrix, for example. The uncertainty parameters 79 quantify expected variation and expected correlation in the expected conditions $E_{Cj}$. This variation and correlation information contained within the expected condition uncertainty parameters 79 is forwarded to the detection module $66_{DM}$ to compute likelihood function values for each of the failure hypotheses $h_j$.

The models within the estimation module $66_{EM}$ quantify the sensitivity of fuel and engine conditions 70, 72, at each corresponding localized node $F_N$, with respect to changes in the failure parameters 69 and with respect to changes in fuel and engine boundary conditions that are conveyed to the estimation module $66_{EM}$, as part of the aggregated observed conditions $O_{Cj}$. For example, a resultant flow through the corresponding localized node $F_N$ can be modeled relative to the conditions effecting changes in flow through the fuel system 60, such as a speed of the fuel pump $62_B$, or a given failure condition, such as a change in leakage area at a given location of the fuel flow path FP. The sensitivity submodule 74 computes hypothesis-specific sensitivity parameters $S_j$ based on model conditions $M_{Cj}$ for the corresponding hypothesis communicated from the expected condition submodule 67. Model conditions $M_{Cj}$ can include model inputs from observed conditions $O_{Cj}$ and internal model state variables. The estimation module $66_{EM}$ can be configured to adjust the expected conditions $E_{Cj}$ based on the set of sensitivities 75 and based on the observed conditions $O_{Cj}$. The set of sensitivities 75 can be based on one or more jacobian equations generated off-line from symbolic differentiation of the models running within estimation module $66_{EM}$. The sensitivity equations can be based on non-linear physics based models, for example. The sensitivity parameters 75 are also used to compute the hypothesis-specific expected condition uncertainty parameters 79. The sensitivities 75 can be in the form of matrices that capture expected changes in fuel and engine conditions 70, 72 driven by changes to the failure parameters values 69, boundary condition values conveyed by the observed conditions $O_{Cj}$ and changes to values of internal model states.

The estimation module $66_{EM}$ executes a no fault model $H_0$ to calculate the expected conditions $E_{C0}$ for a fault free or no fault hypothesis $h_0$. The estimation module $66_{EM}$ also executes one or more models $H_j$ to calculate the expected conditions $E_{Cj}$ for one or more failure hypotheses $h_j$.

In alternative embodiment, the estimation module $66_{EM}$ executes the no fault hypothesis model $H_0$ but does not estimate the expected conditions $E_{Cj}$ for the failure hypotheses $h_j$. In this embodiment, the expected conditions $E_{Cj}$ are set to the model conditions $M_{Cj}$, and the expected conditions $E_{Cj}$ and covariances are communicated from the expected condition submodule 67 to the detection module $66_{DM}$.

Each failure hypothesis may correspond to a dynamic hypothesis model $H_j$ that computes changes in the fuel conditions 70 and/or engine conditions 72 over a given time, for example, such as changes in fluid flow, temperature, pressure, speed, and position over time. In another embodiment, each failure hypothesis model $H_j$ is a steady state model to provide the desired solution when the fuel system 60 and engine 20 are near or at steady-state operation. Various scheduling techniques can be utilized to test the failure hypotheses $h_j$, including execution of multiple failure hypotheses models H in different allocated computational time window, or two or more failure hypotheses models H executed concurrently.

One example hypothesis $h_0$ may correspond to a no fuel fault hypothesis model ($H_0$) and can be indicative of normal operation of the fuel system 60, or within an expected range of operation. Other example hypotheses can include failure hypotheses $h_1$ to $h_j$ which can relate to one or more abnormalities of the fuel system 60, with each hypotheses $h_j$ corresponding to a hypothesis model ($H_1$, $H_2$, . . . , $H_j$). For example, one failure hypothesis $h_j$ can include a leakage condition at one of the localized nodes $F_N$, such as one of the conduits or couplings. Other example failure hypothesis $h_j$ can include a failure condition of one of the components 62, such a bias of the flowmeter $62_G$, drift of actuator $62_F$ or metering valve $62_A$, a failure of one of the fuel and engine sensors 65, 68, a line rupture of the sensor for measuring burner pressure ($P_B$) due to freezing, or degradation of one of the fuel injectors $56_A$.

Fuel observation assembly 66 can include an engine module 71 configured to estimate present values of one or more of the fuel and engine conditions 70, 72. The estimated values can be utilized in combination with, or as an alternative to, values from the fuel and engine sensors 65, 68. For example, the engine module 71 may be configured to estimate fuel flow ($W_f$) between the fuel system 60 and the engine 20, or burner pressure ($P_B$) of the combustor 56 based on values of one or more of the engine sensors 68, such as actuator values, rotor speeds (N1, N2), and/or gas path temperatures or pressures of the engine 20. The estimated values of the engine module 71 can be utilized, for example, in situations where one or more fuel sensors 65 or engine sensor 68 have malfunctioned.

In the illustrated embodiment, the detection module $66_{DM}$ includes a fault comparison submodule 73 operable to detect abnormalities in the fuel system 60. The fault comparison submodule 73 is operable to detect an abnormality, in response to evaluating one or more differences or deviations (i.e., residuals) between observed conditions $O_{Cj}$, and expected conditions $E_{Cj}$ of each of the failure hypotheses models $H_j$. The comparison submodule 73 can determine whether the differences (i.e. residuals) of one or more of the failure hypotheses $h_j$ are greater than a predetermined threshold. In the illustrated embodiment, the residuals may be used to calculate the corresponding a likelihood function $L_j$, which is directly related to the respective conditional probability for each hypothesis $h_j$. The likelihood functions $L_j$ can be evaluated in an architecture of bank of Kalman Filters approach, for example. In another embodiment, the likelihood functions $L_j$ can be calculated as a weighted sum of the described residuals, either at the current time instant or averaged over a pre-selected number of previous time steps, in a moving horizon manner.

As a detailed description, the detection module $66_{DM}$ is operable to determine a fuel system abnormality corresponding to one of the localized notes $F_N$ based on a comparison of the hypothesis-specific expected conditions $E_{Cj}$ and the observed conditions $O_{Cj}$ for each of the localized nodes $F_N$. The detection module $66_{DM}$ can compute a likelihood function value for each of a predetermined set of failure hypotheses models (e.g., $H_0$, $H_1$ ... $H_j$), with each of the failure hypotheses $h_j$ of the set of failure hypotheses models $H_j$ corresponding to at least one of the failure parameters 69 of a corresponding one of the localized nodes $F_N$.

In an embodiment, one set of inputs to the likelihood function calculations includes a numerical difference between the observed conditions $O_{Cj}$ and the corresponding expected conditions $E_{Cj}$, that parallel the observed conditions $O_{Cj}$ (i.e. conditional residuals). The detection module $66_{DM}$ receives the set of uncertainty parameters 76 quantifying expected uncertainty in the observed conditions $O_{Cj}$ and the set of uncertainty parameters 79 quantifying uncertainty and correlation of expected conditions $E_{Cj}$. The uncertainty values corresponding to the observed conditions $O_{Cj}$ and expected conditions $E_{Cj}$ can be combined to form a set of uncertainty parameters for the condition residuals, which can be represented by a residual covariance matrix $R_j$. The residual covariance quantifies the expected variance in the residuals as well as the expected pair-wise correlation between each of the residuals. The residual covariance can be used to mathematically quantify the alignment of the residual pattern or signature with the expected patterns captured in the residual covariance matrix. In the illustrated embodiment, the detection module $66_{DM}$ utilizes a set the residuals and set of uncertainties associated with each failure hypothesis $h_j$ to evaluate a corresponding failure likelihood function $L_j$. Equation 1 illustrates an example of a likelihood function $L_j$ for a single hypothesis $h_j$ as a function of observed conditions $O_{Cj}$, expected conditions $E_{Cj}$ and the residual error covariance matrix, $R_j$:

$$L_j \propto \exp(-(O_{Cj}-E_{Cj})^T R_j^{-1}(O_{Cj}-E_{Cj}))  \quad \text{Equation 1:}$$

where T corresponds to the vector transpose operator.

In alternative embodiments, the estimation module $66_{EM}$ and detection module $66_{DM}$ can include a combined, model for two or more of the failure hypotheses $h_j$, and/or can be executed sequentially over one or more time periods and with different frequencies, specific to each hypothesis $h_j$.

In the illustrated embodiment, the fuel observation assembly 66 includes a fault isolation module $66_{FI}$ operable to isolate the abnormality by associating the abnormality with a particular one of the localized nodes $F_N$. In some embodiments, the fault isolation module $66_{FI}$ is operable to associating the abnormality with a particular one of the failure parameters 69 of a corresponding one of the localized nodes $F_N$, such as a fuel leakage condition or a sensor failure at one of the localized nodes $F_N$. The fault isolation module $66_{FI}$ is operable to evaluate the results of each failure hypothesis $h_j$ in order to select a particular one of the failure hypotheses $h_j$ corresponding to one of failure parameters 69 defined for the corresponding localized node $F_N$.

In the illustrative embodiment, the isolation module $66_{FI}$ utilizes one or more statistical techniques to select a maximum-likelihood failure hypothesis $h_j$ corresponding to the abnormality based on a best fit of the data. The maximum-likelihood failure hypothesis $h_j$ may correspond to an abnormality corresponding to a single parameter of the failure parameters 69 of a corresponding localized node $F_N$, such as a leakage condition at localized node $F_{N2}$ (FIG. 2). Other technique for selecting one of the failure hypotheses $h_j$ may also be utilized, including other statistical techniques, such as likelihood ratio tests, calculated using the likelihood functions $L_i$ disclosed above, and Pearson's chi-squared test.

In some embodiments, the isolation module $66_{FI}$ is operable to isolate two or more failure hypotheses $h_j$ that have likelihood functions $L_j$ each meeting the at least one predetermined criterion and that are within a predetermined range relative to each other. For example, a difference between a likelihood of two failure hypotheses $h_j$ may not be statistically significant based on a single iteration of the data. The isolation module $66_{FI}$ can be operable to utilize subsequent iterations of sensor information to evaluate which of the failure hypotheses $h_j$ is the most likely one corresponding to or otherwise explaining the abnormality. This technique may be utilized to improve a confidence level of the selected one of the failure hypotheses $h_j$, for example.

In the illustrative embodiment, the fuel observation assembly 66 includes a fault validation and estimation module $66_{VE}$ operable to estimate a magnitude of the failure parameter 69, such as a size of a leak at the localized node $F_N$ or flow rate relating to a loss of flow through the leak. Estimating the magnitude of the failure can be based on using a model-based estimator as represented by the expected conditions submodule 67, operable to estimation of the failure parameter 69 associated with the isolated failure hypothesis $h_j$, and additionally admitting the estimation of uncertainty parameters 79 that are associated with a normal, non-failure state of the fuel system 60. Admitting estimation of additional uncertainty parameters 79 associated with normal variations enables a refined estimate of the failure parameter 69 associated with the isolated failure hypothesis $h_j$. Estimating the magnitude of the failure parameter 69 can also be based on estimating a location of the failure parameter 69 relative to the fuel flow path FP.

In some situations, a selected one of the failure hypotheses $h_j$ may not fully account for the deviation between the expected condition $E_{Cj}$ and observed condition $O_{Cj}$ of each of the failure hypotheses $h_j$. This may occur, for example, due to an upstream one of the localized nodes $F_N$ having a particular failure condition, which causes the observance of an abnormality at a downstream one of the failure nodes $F_N$. In one example, a failure of the metering valve $62_A$ could occur, such as due to a drafting condition, but the selected failure hypothesis $h_j$ may correspond to a leakage condition. In this example, none of the pressures of adjacent portions of the fuel flow path FP may be changing, but values of positions of the metering valve $62_A$ may be changing.

In some embodiments, the fault validation and estimation module $66_{VE}$ is operable to cause the estimation module $66_{EM}$ to adjust subsequent iteration(s) of the expected condition $E_C$ in response to determining the abnormality identified by the isolation module $66_{FI}$. The fault validation and estimation module $66_{VE}$ may also determine a second, different abnormality corresponding to another failure parameter 69 corresponding to one of the localized nodes $F_N$ in response to an adjustment of the expected condition $E_C$. In an embodiment, the fault validation and estimation module $66_{VE}$ is operable to cause the estimation module $66_{EM}$ to adjust the expected condition $E_C$ during one or more iterations until a desired portion of the deviation between each expected condition $E_{Cj}$ and observed condition $O_{Cj}$ can be explained through the selected failure hypothesis $h_j$. In one embodiment, the estimation module $66_{EM}$ is operable to calculate the expected condition $E_C$ based upon previous calculation(s) of one or more previous expected conditions $E_{Cj}^{-1}$, which may be averaged or sampled over time. This may include, for example, an adjustment to the expected condition $E_{Cj}$ based on the identified abnormality. Utilizing these techniques can improve accuracy in detecting and isolating an abnormality.

The fuel observation assembly 66 includes an announcement module $66_{AN}$ operable to announce an abnormality to other components of the controller 64, engine 20 and/or aircraft. The fault detection module $66_{DM}$, fault isolation module $66_{FI}$, and/or the fault validation and estimation module $66_{VE}$ can be configured to cause the announcement module $66_{AN}$ to announce the abnormality and related information. For example, the announcement can be associated with an abnormality of the fuel system 60, a particular one or more of the localized nodes $F_N$, and/or a particular one or more of the failure hypotheses $h_j$ or failure parameters 69 corresponding to the localized node $F_N$. As another example, the identification and announcement of the novel hypothesis may be communicated to health monitoring or other maintenance systems to further determine the cause of the abnormality, optionally with an indication that the other hypotheses $h_j$ corresponding to the other failure parameters 69 and localized nodes $F_N$ are an unlikely cause of the abnormality.

The announcement module $66_{AN}$ is operable to announce or otherwise communicate information relating to the abnormality to another portion of the controller 64, or various subsystems such as one or more subsystems 21 of the engine 20 and/or aircraft, including an onboard diagnostics subsystem. Example announcements can include one or more alerts communicated to an aircraft cockpit in response to the abnormality meeting at least one predetermined criterion, such as a predefined threshold relating to excessive fuel leakage. Some alerts can be dispatched and/or recorded for maintenance, depending on the level of severity, for example.

The fuel observation assembly 66 can include an accommodation module $66_{AC}$ operable to provide an accommodation of information affected by, or otherwise relating to, the abnormality. Upon detection of a failure of one or more of the fuel sensors 65 and/or engine sensors 68, the measured value can be substituted with an estimated/observed value which can be used by another system consuming the data, such as an engine control system. Example accommodations can include estimated values of the fuel and engine sensors 65, 68 affected by the abnormality, such as burner pressure ($P_B$), which can be utilized by recipient systems that may be dependent on sensor measurements. As another example, the accommodation module $66_{AC}$ may estimate the actual fuel flow to the engine 20 and/or at one of the localized nodes $F_N$ affected by the abnormality, which may be utilized as an early warning or for updating a flight plan of the aircraft. In yet another example, the accommodation relates to a leakage condition of an actuator for a fuel-draulics system, such as actuator $62_F$ (FIG. 2). Upon detection and isolation of such a failure, the information is communicated to the control system, which accommodates the failure by minimizing or otherwise reducing, through one or more control commands, conditions in which the failure would adversely affect operation of the engine 20.

In one embodiment, the accommodation module $66_{AC}$ is operable to cause a flight plan of an aircraft to adjust based on the estimated fuel flow relating to the abnormality. In another embodiment, the accommodation module $66_{AC}$ is operable to cause a change in the maintenance schedule of engine 20. In one embodiment, the accommodation module $66_{AC}$ may cause the FADEC to record the abnormality for off-line maintenance processing for diagnostics and health. Other example accommodations can include an estimate of the burner pressure ($P_B$) of the combustor 56. Utilizing these techniques, the fuel observation assembly 66 can function as a virtual sensor for providing information to other subsystems/systems during a sensor failure condition or other abnormality. In some embodiments, portions of the fault isolation module $66_{FI}$, validation and estimation module $66_{VE}$, announcement module $66_{AN}$ and/or accommodation module $66_{AC}$ is combined and/or incorporated into the comparison submodule 73.

Figure 4:
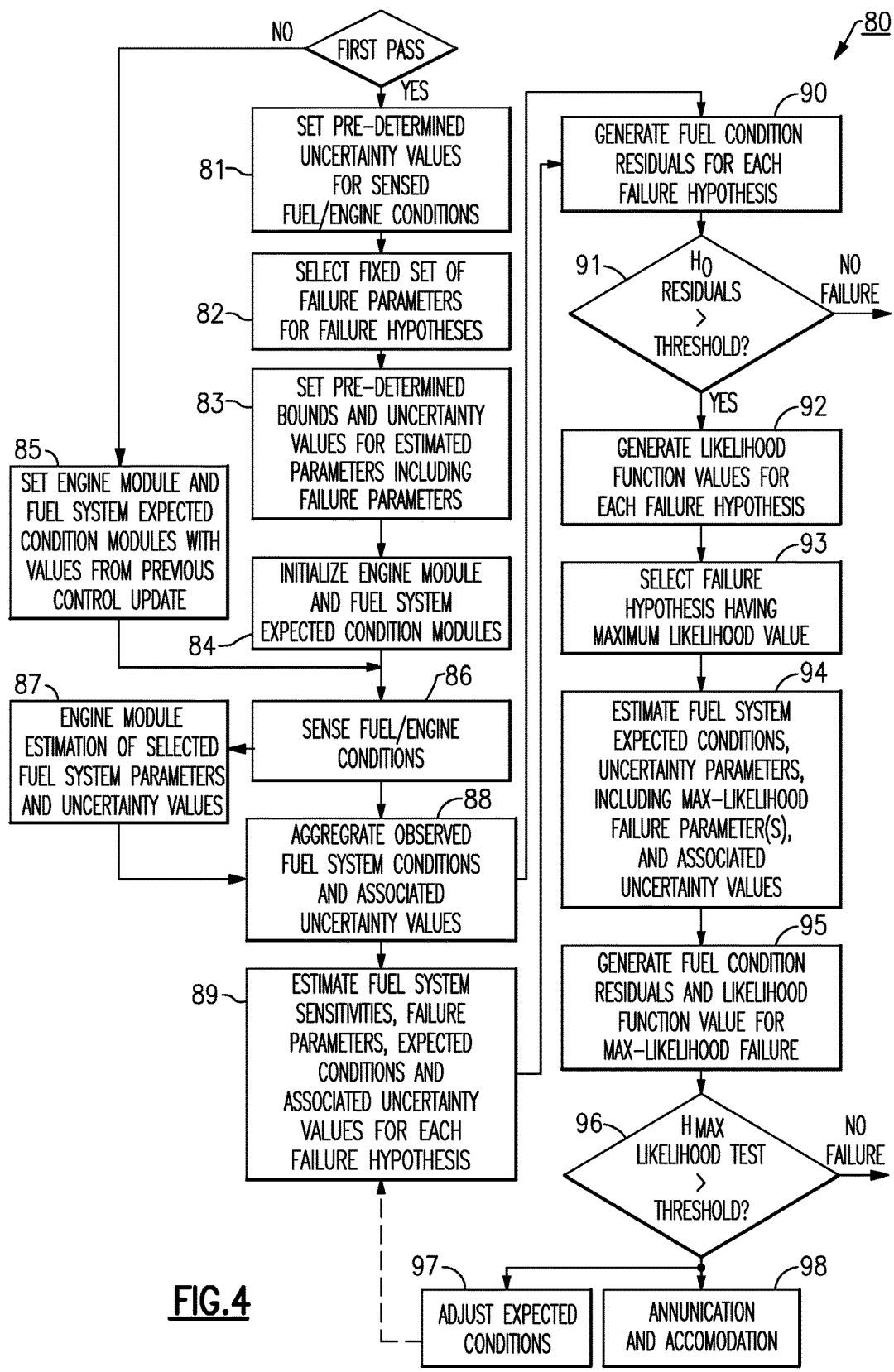
FIG. 4 illustrates a process for detecting an abnormality of a fuel system, according to an embodiment.

FIG. 4 illustrates an example process or algorithm depicted as flow chart 80 for detecting a fuel leakage condition or other abnormality relating to a fuel assembly. In some embodiments, the algorithm 80 is utilized together with the fuel observation assembly 66 to detect abnormalities of the fuel system 60. For example, the algorithm may be programmed in the controller 64 or another location of the engine 20 and/or aircraft.

Steps 81 thru 84 represent algorithmic steps that are operable to set constant configuration parameters for fuel observation algorithm 80 during initialization. At step 81, uncertainty values are set for fuel system measurements. This can include, for example, uncertainty due to absolute and/or relative accuracy of fuel and engine sensors 65, 68. At step 82, a set of uncertain fuel system parameters of the fuel system 60 is established, including the set of failure parameters 69. At step 83, uncertainty values and bounds on failure parameters and fuel system estimated conditions are set. Also at step 83, a failure hypothesis $h_j$ for each failure parameter 69 corresponding to the localized nodes $F_N$ is established, including any of the hypotheses discussed herein. The step includes associating each of the localized nodes $F_N$ with the one or more failure parameters 69, each of which are distinct to the respective localized node $F_N$.

In the illustrated embodiment, at step 84 the algorithm 80 can establish or instantiate and initialize one or more fuel system expected condition submodules 67 and associated sensitivity models 74 for each failure hypothesis $h_j$. If the controller 64 has completed initialization and a first pass through algorithm 80, the algorithm can bypass steps 81 thru 84 on subsequent passes and branch to step 85. At step 85, states of the one or more fuel system expected condition submodules 67 can be started with values from the previous pass, which can include values from step 94, representing expected condition estimates for the isolated failure hypothesis $h_j$ from the previous pass.

At step 86, the present state of one or more of the fuel conditions 70 and/or engine conditions 72 are measured or otherwise sensed. In the illustrated embodiment, at step 87 one or more sensor values can be estimated, such as any of the sensor values previously discussed relating to the engine module 71. At step 88, a set of observed conditions $O_C$ is calculated or otherwise determined for each of the localized nodes $F_N$, and aggregated based upon the fuel/engine sensed conditions from step 86 and the engine module estimates from step 87.

At step 89, expected conditions $E_{Cj}$ of one or more of the localized nodes $F_N$ are calculated or otherwise determined for the one or more failure hypotheses $h_j$. The expected conditions are based on the uncertain fuel system parameters including the set of failure parameters 69 and/or the one or more observed conditions $O_{Cj}$ corresponding to one or more of the fuel and engine conditions 70, 72, including any discussed herein.

At step 90, the expected condition $E_{Cj}$ and observed condition $O_{Cj}$ are compared or evaluated for each of the failure hypotheses $h_j$. The functionality of evaluating the failure hypotheses $h_j$ and detecting an abnormality can be provided by the detection module $66_{DM}$, for example. In the illustrated embodiment, the comparison includes generating residuals which are the mathematical difference between the expected condition $E_{Cj}$ and observed condition $O_{Cj}$. In some embodiments, the results of step 90 are adjusted for conditional covariance for each failure hypotheses $h_j$ to account for uncertainty of various parameters of the fuel system 60 and engine 20 being modeled, and variation of sensor measurements, for example.

At step 91, the algorithm 80 detects or otherwise determines whether an abnormality relating to operation of the fuel system 60 has occurred. In some embodiments, the algorithm determines that an abnormality has occurred in response to a difference between the expected condition $E_{Cj}$ and the observed condition $O_{Cj}$ (i.e. residuals) of at least one of the localized nodes $F_N$ meeting at least one predetermined criterion, such as a failure threshold. In the illustrated embodiment, the residuals from the null or no failure hypothesis $h_0$ are compared to determine existence of an abnormality. The desired failure threshold may be selected based on a norm of the residuals relating to uncertainty and variability of the expected and observed conditions $E_{Cj}$, $O_{Cj}$, for example.

At step 92, a likelihood function $L_j$ of each failure hypothesis $h_j$ is evaluated. In some embodiments, a likelihood output for each failure hypothesis $h_j$ is calculated based on comparing the expected condition $E_{Cj}$ and the observed condition $O_{Cj}$ for the corresponding localized node $F_N$.

Each likelihood output can also be evaluated to determine whether the likelihood output meets at least one predetermined criterion, such as a desired likelihood threshold. For example, the likelihood threshold can be based upon a magnitude or rate of fuel loss relating to a detected leakage condition. Each of the predetermined criteria can be selected to reduce a likelihood of falsely announcing an abnormality. In the illustrated embodiment, the calculation of each likelihood output is based on the uncertainty values associated with the expected conditions $E_{Cj}$ and the sensitivities calculated at step 89 and is based on the uncertainty values associated with the observed conditions $O_{Cj}$ determined at step 88. In some embodiments, the algorithm 80 announces or otherwise communicates a detection of the abnormality in response to the predetermined criterion being met, including any of the techniques for detecting an anomaly disclosed herein.

The algorithm 80 can include functionality to isolate, estimate, and/or accommodate the abnormality. At step 93, the algorithm 80 selects a likely failure hypothesis $h_j$ relating to the abnormality, corresponding to a single one of the set of failure parameters 69 and localized nodes $F_N$. In other embodiments, two or more failure hypotheses $h_j$ may be selected for diagnostics to further identify the underlying abnormality. For example, each of the two or more abnormalities may be evaluated by maintenance personnel to isolate the leakage condition or sensor failure, thereby reducing maintenance time. In some embodiments, the functionality of isolating the abnormality is provided by fault isolation module $66_{FI}$.

At step 94, estimated values of the failure parameters 69 can be recalculated, conditioned on the most likely or selected failure hypothesis $h_j$. Recalculation of the failure parameters 69 can include, for example, simultaneous estimation of an expanded set of normal uncertainty parameters, in addition to the failure parameters, to refine estimates of the failure parameter magnitude. At step 95, the algorithm 80 reevaluates a likelihood of the isolated failure relative to the likelihood of the other failure hypotheses $h_j$ (i.e., previously calculated in step 92), conditioned on the selected failure hypothesis $h_j$ and failure parameters 69 estimated at step 94. In some embodiments, the algorithm 80 utilizes one or more subsequent iterations of sensor data from fuel sensors 65 and/or engine sensors 68. Also, step 94 can include estimating a magnitude of the failure parameter 69, such as an estimated size of the detected leak or rate of fuel loss.

The algorithm 80 may utilize the techniques discussed above regarding step 91, for example, to determine whether the selected failure hypothesis $h_j$ accounts for deviation between expected and observed conditions $E_{Cj}$, $O_{Cj}$ corresponding to the detected abnormality. The algorithm 80 may exclude the selected failure hypothesis $h_j$ if the hypothesis does not account for a desired portion of the deviation, and may evaluate the remaining failure hypotheses $h_j$ at step 92 to select another most likely one of the remaining failure hypotheses. Utilizing these techniques, step 95 may function to verify that the failure hypothesis $h_j$ has been correctly selected.

At step 96, the algorithm 80 verifies or otherwise determines whether an abnormality relating to operation of the fuel system 60 has occurred. Each likelihood output based on the results of step 95 can be evaluated to determine whether the likelihood output meets at least one predetermined criterion, such as the desired likelihood threshold or other criteria discussed above for step 91.

In some embodiments, at step 97 one or more subsequent iterations of the expected condition $E_C$ are adjusted at step 89 based on the selected failure hypothesis $h_j$ and estimated value of the corresponding failure parameter 69. In some embodiments, the functionality of verifying and estimating the abnormality is provided by validation and estimation module $66_{VE}$.

At step 98, the algorithm 80 announces or otherwise communicates a detection of the abnormality. In some embodiments, the functionality of announcing the abnormality and related information is provided by announcement module $66_{AN}$. The announcement can relate to a single one of the failure parameters 69 of a corresponding one of the localized nodes $F_N$, for example. The algorithm 80 may also provide an accommodation of information, including estimated values of one or more sensor values which may be utilized by other subsystems of the engine 20 and/or aircraft, for example. For example, isolation of a rupture in the combustor pressure sense line can be accommodated by replacement of the sensed value with estimated values from the engine module 71 or fuel system expected condition module $66_{EM}$. Other example outputs can include a calculation of fuel flow through the localized node $F_N$ based on estimated values of the failure parameter 69 relating to the selected abnormality. In embodiments, the functionality of accommodating information affected by or otherwise relating to the abnormality is provided by accommodation module $66_{AC}$.

The controller 64 can include a processor, a memory and an interface. The processor may, for example only, be any type of known microprocessor having desired performance characteristics. The memory may, for example only, includes UVPROM, EEPROM, FLASH, RAM, ROM, DVD, CD, a hard drive, or other computer readable medium which may store data and algorithm 80 for operation of the fuel observation assembly 66 as described herein. The interface facilitates communication with the other systems or components of the engine 20 or aircraft. The controller 64 can be a portion of a full authority digital engine control (FADEC) such as an electronic engine controller (EEC), another subsystem of the engine 20 or aircraft, or a stand-alone system, for example, or part of a distributed, on-board processing architecture. In other examples, functionality of controller 64 is executed on two different FADECs and/or processors.

It should be understood that relative positional terms such as "forward," "aft," "upper," "lower," "above," "below," and the like are with reference to the normal operational attitude of the vehicle and should not be considered otherwise limiting. Although the different embodiments and examples have the specific components shown in the illustrations, embodiments of this disclosure are not limited to those particular combinations. It is possible to use some of the components or features from one of the embodiments or examples in combination with features or components from another one of the embodiments or examples. Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A fuel system for a gas turbine engine, comprising:
a plurality of components defining a plurality of localized nodes at distinct locations relative to a fuel flow path, each of the plurality of localized nodes characterized by a distinct set of failure parameters;
one or more fuel sensors configured to measure at least one fuel condition relating to flow through the fuel flow path; and
a fuel observation assembly coupled to one or more engine sensors configured to measure at least one engine condition, the fuel observation assembly comprising:
an estimation module operable to calculate an expected condition of each of the plurality of localized nodes based upon the set of failure parameters;
an observation module operable to calculate an observed condition of each of the plurality of localized nodes, the observed condition based on present values of the at least one fuel condition and the at least one engine condition; and
a comparison module operable to determine an abnormality corresponding to a first one of the plurality of localized nodes based upon a comparison of the expected condition and each observed condition for the plurality of localized nodes.

2. The fuel system as recited in claim 1, wherein the estimation module is operable to calculate the expected condition of each of the plurality of localized nodes based upon estimated values and observed values of the at least one fuel condition and estimated values and observed values of the at least one engine condition.

3. The fuel system as recited in claim 2, wherein the plurality of components includes a metering valve operable to regulate flow through the fuel flow path in response to a metering signal, and the at least one fuel condition includes the metering signal.

4. The fuel system as recited in claim 3, wherein the plurality of localized nodes are defined by at least a plurality of fuel injectors and one or more actuators in the fuel flow path.

5. The fuel system as recited in claim 2, wherein the at least one fuel condition relates to one or more fuel boundary conditions affecting flow through the fuel flow path and one or more fuel command signals to the plurality of components, and the at least one engine condition relates to one or more engine boundary conditions.

6. The fuel system as recited in claim 5, wherein the one or more fuel boundary conditions include a burner pressure of a combustor and a speed of a fuel pump coupled to a fuel source.

7. The fuel system as recited in claim 1, wherein the observed condition relates to a fuel flow rate through a corresponding one of the plurality of localized nodes.

8. The fuel system as recited in claim 1, wherein the estimation module is operable to calculate the expected condition of each of the plurality of localized nodes based upon a previous calculation of the corresponding expected condition.

9. The fuel system as recited in claim 1, wherein the estimation module is operable to adjust the expected condition based upon a set of failure hypotheses and associated uncertainty parameters and sensitivity parameters, the set of sensitivity parameters based on a relationship between the set of failure parameters, the at least one fuel condition, and the at least one engine condition.

10. The fuel system as recited in claim 1, wherein the abnormality is a first abnormality, the comparison module is operable to cause the expected condition to be adjusted based on the first abnormality, and is operable to determine a second, different abnormality corresponding to another one of the plurality of localized nodes in response to adjustment of the expected condition.

11. A propulsion system, comprising:
a gas turbine engine including a combustor section in flow communication with a turbine section;
a fuel system defining a plurality of localized nodes including a metering valve, the metering valve operable to meter flow between the combustor section and a fuel source in response to a metering signal, each of the plurality of localized nodes characterized by a distinct set of failure parameters; and
a fuel observation assembly coupled to the engine and the fuel system, the fuel observation assembly comprising:
an estimation module operable to calculate an expected condition of each of the plurality of localized nodes based upon: (a) at least the metering signal, (b) at least one fuel condition relating to the fuel assembly, and (c) at least one engine condition relating to the engine;

wherein the expected condition corresponds to at least one parameter of the set of failure parameters;

an observation module operable to calculate an observed condition of each of the plurality of localized nodes based on present values of the at least one fuel condition and the at least one engine condition;

and a comparison module operable to determine an abnormality corresponding to a first one of the plurality of localized nodes based upon a comparison of the expected condition and each observed condition for the plurality of localized nodes.

12. The propulsion system as recited in claim 11, wherein the estimation module is operable to calculate the expected condition based on a first control signal to the engine and a second control signal to the fuel system, each of the first and second control signals relating to fuel flow through the fuel assembly.

13. The propulsion system as recited in claim 11, wherein the comparison module is operable to associate the abnormality with a single parameter of the set of failure parameters.

14. The propulsion system as recited in claim 11, wherein the set of failure parameters includes at least a leakage condition and a sensor failure condition relating to a corresponding one of the plurality of localized nodes.

15. The propulsion system as recited in claim 11, wherein the at least one fuel condition relates to one or more boundary conditions of the fuel system and one or fuel command signals to the fuel system, and the at least one engine condition relates to one or more boundary conditions of the engine.

16. The propulsion system as recited in claim 11, the plurality of localized nodes are defined by at least one of a fuel pump coupled to the fuel source, an actuator, the metering valve, a distribution valve coupled to fuel injectors of the combustor section, and the combustor section.

17. The propulsion system as recited in claim 11, wherein the comparison module is operable to cause an alert to be communicated to an aircraft cockpit in response to the abnormality meeting at least one predetermined criterion.

18. The propulsion system as recited in claim 11, wherein the comparison module is operable to calculate an estimated fuel flow through the fuel assembly based on the abnormality, and is operable to cause a flight plan of an aircraft to adjust based on the estimated fuel flow.

19. The propulsion system as recited in claim 11, wherein the abnormality relates to a sensor failure, the comparison module is operable to estimate a present value of the one or more fuel sensors and the one or more engine sensors associated with the abnormality, and is operable to communicate the present value to an engine control system.

20. The propulsion system as recited in claim 11, wherein the estimation module is operable to adjust the expected condition based upon a set of failure hypotheses and associated uncertainty parameters and sensitivity parameters, the set of sensitivity parameters based on a relationship between the set of failure parameters, the at least one fuel condition, and the at least one engine condition.

21. The propulsion system as recited in claim 11, wherein the combustor section includes a plurality of fuel injectors, and the set of failure parameters includes at least a nozzle lacquering delta area of each respective one of the plurality of fuel injectors.

22. The propulsion system as recited in claim 11, wherein the set of failure parameters includes at least a previously uncategorized failure condition defined relative to two or more localized nodes of the plurality of localized nodes.

* * * * *